United States Patent
Yanagidaira et al.

[11] 3,879,671
[45] Apr. 22, 1975

[54] SYSTEM FOR DETECTING A DIGITAL PHASE-MODULATED WAVE

[75] Inventors: Hidetaka Yanagidaira, Ohmiya; Kazuo Kawai, Yokohama; Sotokichi Shintani; Katsuhiko Furuya, both of Tokyo, all of Japan

[73] Assignee: Kokusai Denshin Denwa Kabushiki Kaisha, Tokyo, Japan

[22] Filed: Oct. 26, 1973

[21] Appl. No.: 409,804

[30] Foreign Application Priority Data
Oct. 30, 1972 Japan.............................. 47-10787

[52] U.S. Cl................................ 329/128; 329/126
[51] Int. Cl. ............................................ H03d 3/04
[58] Field of Search .......... 329/102, 104, 105, 110, 329/126, 128; 325/325, 321

*Primary Examiner*—John Kominski
*Attorney, Agent, or Firm*—Robert E. Burns; Emmanuel J. Lobato; Bruce L. Adams

[57] ABSTRACT

A system for detecting the phase position of each signal element of a phase-modulated wave digitally phase-modulated in synchronism with a predetermined modulation timing, in which a time interval between one of the zero crossing points of the phase-modulated wave and one of the zero crossing points of a reference carrier immediately succeeding to the former zero crossing point is measured by digital counting, whereby the amount representative of the phase position of each signal element of the digital phase-modulated wave is obtained in the form of a digital amount.

5 Claims, 5 Drawing Figures

FIG. 3
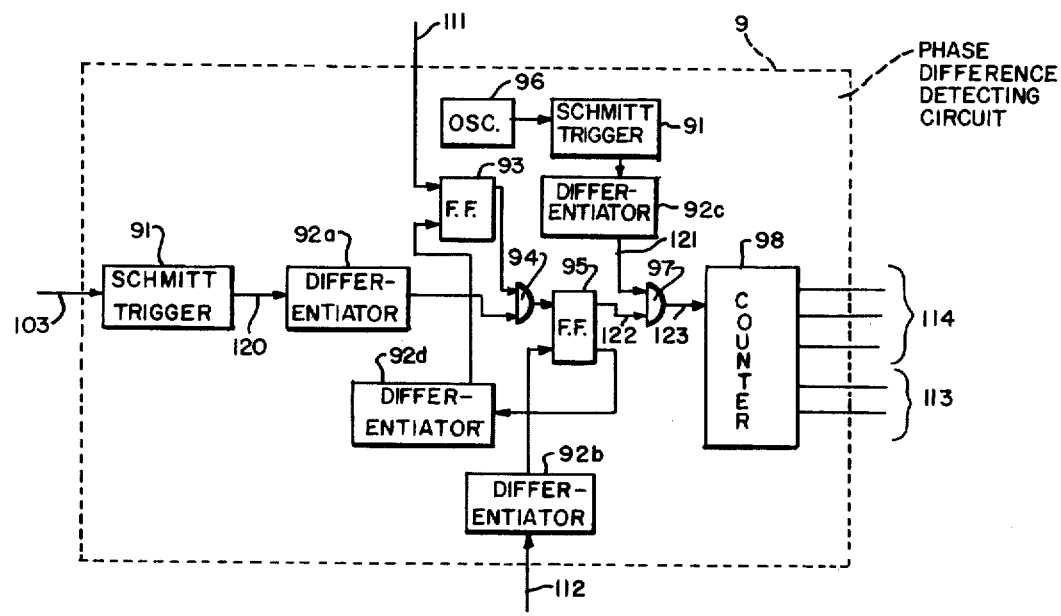
FIG. 4
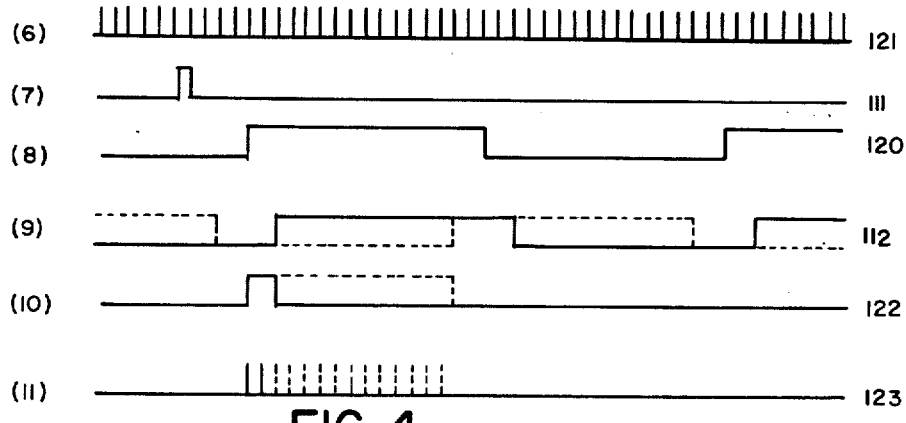
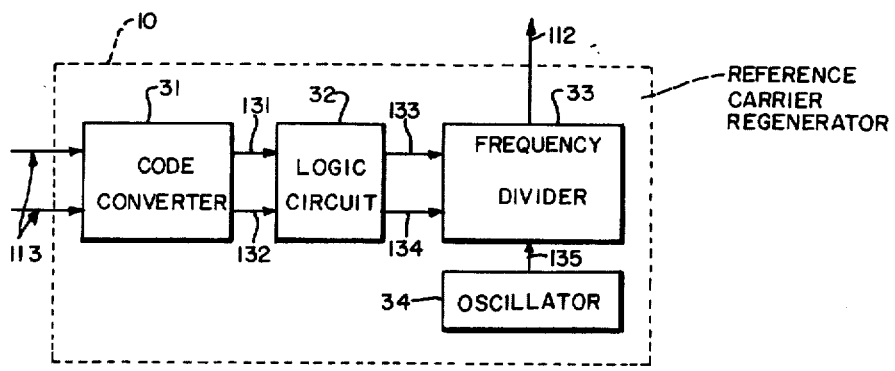
FIG. 5

SYSTEM FOR DETECTING A DIGITAL PHASE-MODULATED WAVE

This invention relates to a system for detecting the phase of each signal element in the demodulation of a phase-shift modulated wave in a digital data communication system.

In the demodulation of the phase-shift modulated wave, it is usual practice to compare a received signal in phase with a reference phase wave generated or reproduced at the received side and to reproduce transmitted information in response to the resulting difference therebetween. There has heretofore been employed, as means for detecting the phase difference between the received signal and the reference phase wave, such a method that the phase of the received signal is detected with two quadrature reference-phase waves or a plurality of reference phase signals successively having the same phase differences thereamong and then applied to a low-pass filter to obtain an analogue voltage in proportion to the cosine and sine of the phase difference, thereby obtaining the phase difference. However, this method has defects that means for generating a plurality of reference phase waves, phase detectors and a low-pass filters are required, and that the output is not an amount proportional to the phase difference itself.

An object of this invention is to provide a system for detecting the phase of each signal element of a digital phase modulated wave capable of phase detecting by digital operations without employing an analogue phase detector.

Another object of this invention is to provide a system for detecting the phase of a digital phase modulated wave obtainable of more accurate digital-phase detecting operations by the employment of a construction which achieve simply and accurately the operation for synchronizing the reference phase of the phase detection with the digital phase modulated wave.

The principle of this invention resides in that the time interval between one of the zero crossing points of a received digital phase modulated wave and one of the zero crossing points of the reference carrier immediately succeeding to the former zero crossing point is measured by digital counting, whereby the amount representative of the phase of each signal element of the digital phase modulated wave is obtained in the form of a digital amount.

Further, in the present invention, the repetition frequency of a clock pulse for the above digital counting is selected at $2^n$ times ($n$ being a positive integer) the frequency of a carrier of the digital phase modulated wave, and the phase of the reference carrier is controlled with lower significant bits of the above counted value except a certain number of upper significant bits determined by the number of quantum phase positions of the phase modulated wave, thereby ensuring more accurate achievement of the above-mentioned digital phase detecting operation.

The construction and operations of this invention will be clearly understood from the following detailed description taken in conjunction with the accompanying drawings: in which:

FIG. 3 is a block diagram illustrating an example of a phase difference detector employed in the embodiment shown in FIG. 1;

FIG. 4 is wave form diagrams explanatory of the operation of the example shown in FIG. 3; and FIG. 5 is a block diagram illustrating an example of a reference carrier generator employed in the embodiment shown in FIG. 1.

Figure 1:
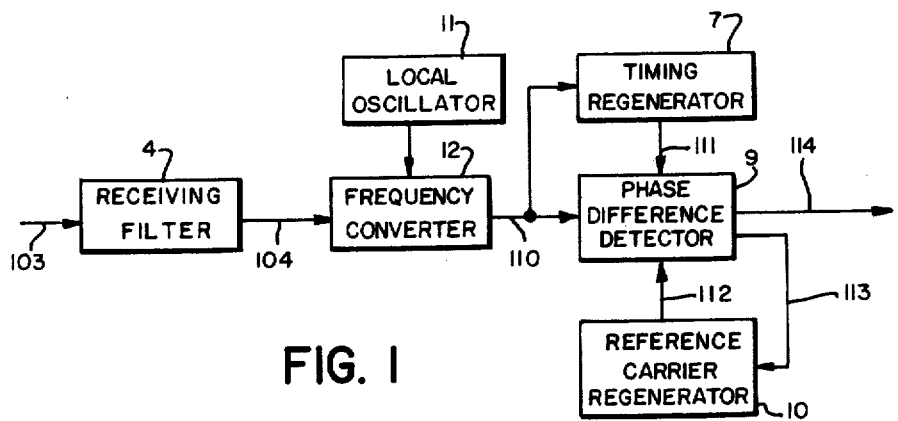
FIG. 1 is a block diagram illustrating an embodiment of this invention.
Figure 2:
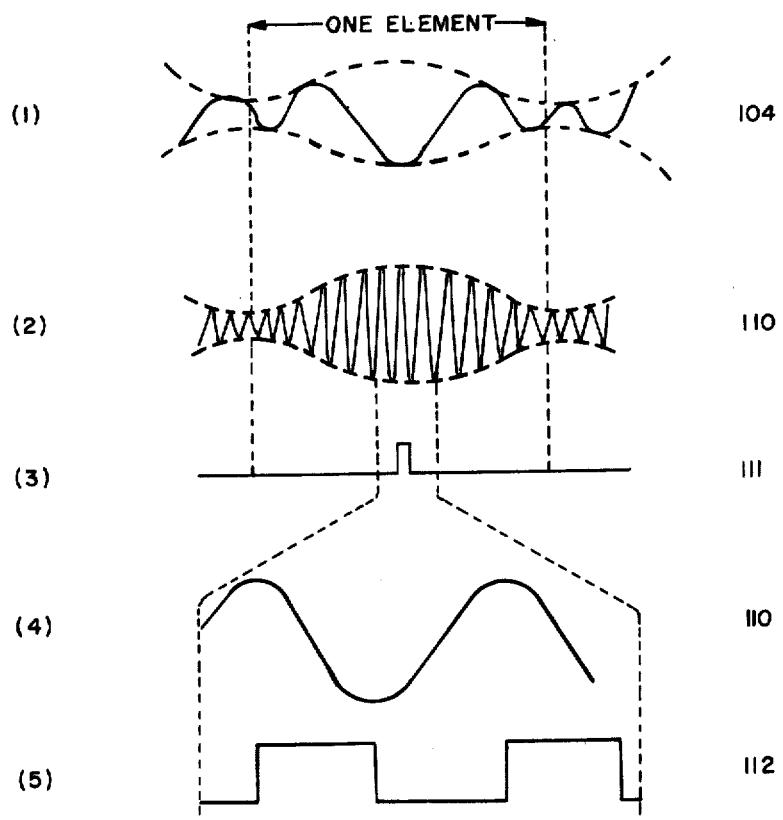
FIG. 2 is wave form diagrams explanatory of the operations of the embodiment shown in FIG. 1.

With reference to FIG. 1, a reference numeral 4 designates a receiving filter for selecting a phase modulated wave 104 from a transmitted wave or waves 103, 11 a local oscillator, and 12 a frequency converter. The output 110 of the frequency converter 12 has a carrier frequency raised up in comparison with its input 104 while their envelopes are held constant as shown in FIG. 2. A reference numeral 7 indicates a timing pulse regenerator, which produces control pulses 111 at the vicinity of the center of each signal element as shown in FIG. 2. A reference numeral 10 identifies a reference carrier regenerator, which controls the phase position of a reproduced reference carrier 112 by an error signal 113 from a phase-difference detecting circuit 9 to synchronize it with one of the quantum phase positions of the received signal 104. The phase-difference detecting circuit 9 detects a difference between the phase position of the reference carrier 112 and that of each signal element of the converted signal 110 at the vicinity of the center thereof (at the instant of the aforementioned control phase which will hereinafter be referred as a sampling instant). In FIG. 2, numerals 1, 2 and 3 show wave forms of the signals 104 and 110 and the pulse 111 for the period of one signal element of them respectively. The waveform 1 is a digitally phasemodulated and band-restricted wave, which has a constricted part in its envelope at each characteristic instant and is ambiguous in phase at the vicinity of this constricted part. The waveform 2 is a waveform of the signal 1 after frequency conversion as described above, in which the envelope and the phase remain unchanged. Accordingly, in order to accurately detect the phase position modulated at the sending side, phase-detection is achieved at a portion of each signal element of stable phase except its starting and terminating portions of unstable phase, for example, at the vicinity of the center of each signal element. Wave forms 4 and 5 are enlarged, in time, waveforms showing the converted signal 110 and the reference carrier 112 only at the vicinity of the center of each signal element.

FIG. 3 is a block diagram illustrating an example of the phase difference detecting circuit 9, in which the phase difference is detected between the converted signal 110 and the reference carrier 112 at the aforementioned sampling instant. In this example, a flip-flop circuit 93 is set by the control pulse 111. The converted signal 110 is further converted by a Schmitt trigger 91 into a rectangular wave 120, and characteristic instants to the positive polarity among its zero crossing points are detected by a differentiator 92a. A reference numeral 94 indicates an AND gate, which is opened in response to a characteristic instant to the positive polarity of the signal 110 immediately after the setting of the flip-flop circuit 93 and then sets a flip-flop circuit 95. On the other hand, the reference carrier 112 is differentiated by a differentiator 92b to obtain characteristic instants to the positive polarity, by which the flip-flop circuit 95 is reset. Accordingly, the flip-flop circuit 95 assumes the state "1" during a period of time from a positive characteristic instant (a characteristic instant to the positive polarity) of the signal 110 immediately after the control pulse 111 to a positive characteristic instant of the reference carrier 112 subsequent to the former characteristic instant. If this period of time is measured, the phase difference between the signal 110 and the reference carrier 112 can be obtained. A reference numeral 96 designates an oscillator, whose output is applied through a Schmitt trigger 91 to a differentiator 92c to provide clock pulses 121. The clock pulses 121 are applied to one input of an AND gate 97. The other input of the AND gate 97 is connected to the output of the flip-flop circuit 95, so that the AND gate 97 is opened where the flip-flop circuit 95 is set to the state "1". Accordingly, the number of output pulses of the AND gate 97 is proportional to the phase difference between the signal 110 and the reference carrier 112. A reference numeral 98 identifies a counter, which counts the output pulses 123 of the AND gate 97 to produce a counted result formed by upper digits 114 and lower digits 113.

It is now assumed that the output frequency of the oscillator 96 has been raised up to $2^n$-times, for example, 32-times the carrier frequency. In this case, one pulse interval $d$ is equal to $2\pi$ radians in terms of the phase of the carrier frequency. In FIG. 4, numerals 6, 7, 8, 9, 10 and 11 show waveforms of the clock pulses 121, the control pulse 111, a rectangular wave 120 converted from the signal 110, the reference carrier 112, an output 122 from the flipflop circuit 95, and an output 123 from the gate 97 respectively. In the waveforms 9 and 10, solid lines show the case where the phase difference between the signal 110 and the reference carrier 112 is $\pi 8$, while broken lines show the case where the phase difference is $7\pi$ Moreover, 2 and 14 pulses are respectively counted in the former case and the latter case. Upon resetting of the flip-flop circuit 95, a differentiator 92d produces a pulse to reset the flip-flop circuit 93 and to ready for a subsequent signal element.

Table 1

| quantum phase positions | counter output 114 | 113 |
|---|---|---|
| 0 | 0 0 0 | 0 0 |
|   | 0 0 0 | 0 1 |
|   | 0 0 0 | 1 0 |
|   | 0 0 0 | 1 1 |
| $\pi/4$ | 0 0 1 | 0 0 |
|   | 0 0 1 | 0 1 |
|   | 0 0 1 | 1 0 |
|   | 0 0 1 | 1 1 |
| $\pi/2$ | 0 1 0 | 0 0 |
|   | 0 1 0 | 0 1 |
|   | 0 1 0 | 1 0 |
| $6\pi/4$ | 1 1 0 | 0 1 |
|   | 1 1 0 | 1 0 |
|   | 1 1 0 | 1 1 |
| $7\pi/4$ | 1 1 1 | 0 0 |
|   | 1 1 1 | 0 1 |
|   | 1 1 1 | 1 0 |
|   | 1 1 1 | 1 1 |

Table 1 shows the outputs 114 and 113 of the counter 98 when an eight-phase phase-modulated wave is detected by the above phase difference detecting circuit 9 to produce the lower two digits 113 and the upper three digits 114. As is apparent from Table 1, the upper three bits 114 indicate which one of the eight quantum phase positions is transmitted. The lower two bits 113 always have a constant value in an ideal condition but, in practice, have a fluctuation due to noise in the received signal, the phase jitter of the reference carrier and a frequency error of the reference carrier. If this fluctuation is low-pass filtered, the influence of the noise is removed, leaving only a deviation in a certain direction due to the frequency error of the reference carrier. Accordingly, it is possible to feed back this error information to control the phase position of the reference carrier to synchronize it with any one of the quantum phase positions of the received signal. In a case where one of the eight quantum phase positions is determined in response to the output 114 of the counter 98 by the use of a simple logic circuit formed by the principle shown in Table 1 by way of example, it is necessary for a maximum margin for noise that the mean value of the output 113 of the counter 98 be at the center between values (01) and (10) in any cases of the eight phase positions. If it is deviated toward (00) or (01), the phase position of the reference carrier advances. On the other hand, if it is deviated toward (10) or (11), the phase position thereof is delayed.

FIG. 5 is a block diagram showing an example of the reference carrier regenerator 10. The output 113 of the above circuit 9 is subjected to code conversion by a code converter 31 as shown in Table 2.

Table 2

| Input 113 | Output 131 | 132 | Phase difference Direction | Amount |
|---|---|---|---|---|
| 0 0 | 0 | 0 | Advance | 2 |
| 0 1 | 0 | 1 |  | 1 |
| 1 0 | 1 | 1 | Delay | 1 |
| 1 1 | 1 | 0 |  | 2 |

An output 131 obtained from the code converter 31 is representative of the direction of deviation of the phase position of the reference carrier, and the other output 132 representative of the amount of deviation. A reference numeral 32 identifies a logic circuit for determining control signals 133 and 134, which control a frequency dividing order for dividing the frequency of the output signal 135 of an oscillator 34 in a frequency divider 33 in response to the phase error information signals 131 and 132. For example, if the amount of error is one, the logic circuit 32 provides the control signal when the error information signals of the same direction has been applied twice in succession. If the amount of error is two, the logic circuit 32 provides the control signal unconditionally. The outputs 133 and 134 of the logic circuit 32 are signals for controlling advances and delay of the phase positions of the reference carrier 112, which is generated from the frequency divider 33. In other words, the frequency divider 33 delays the phase position of its output by increasing its division order when supplied with the signal 133 and, when supplied with the signal 134, advances the phase position of its output by division order. Consequently, an output of the frequency divider 33 is the carrier 112, which is controlled to be synchronized with the reference phase corresponding to one of the quantum phase positions of the received signal.

In accordance with this invention, it is possible to achieve demodulation of the phase-modulated waves by an entirely digital circuitry without employing a conventional analogue phase detector and to contribute to miniaturization of the demodulator and to enhancement of accuracy of its operation.

It will be apparent from the foregoing description that this invention can be practised irrespective of the number 2, 4, 8, . . . . of the quantum phase positions and is also applied to digital phase modulated waves of any of a fixed phase system and a differential phase system.

What we claim is:

1. A system for detecting the phase of a constant phase signal element of a phase-modulated carrier wave comprising:
   input means for receiving the phase-modulated carrier wave;
   first means connected to said input means for generating a control pulse during a stable portion stable in phase of each signal element of said phase-modulated wave;
   second means for generating clock pulses having a repetition frequency sufficiently higher than the frequency of the carrier of said phase-modulated wave;
   third means for generating a reference carrier wave;
   fourth means operatively coupled to said input means, said first means, said second means and said third means for developing in response to said control pulse, said phase-modulated wave and said reference carrier wave a counting control signal for determining a counting period corresponding to a period between a zero crossing of the phase-modulated wave and a zero crossing of the reference carrier immediately succeeding the first mentioned zero crossing; and
   fifth means connected to said second means and said fourth means and receptive of said clock pulses and siad counting control signal for counting said clock pulses only during said counting period to determine the relative phase of said reference carrier wave relative to the phase of each signal element of a phase-modulated wave and for developing digital output signals representative of said relative phase.

2. A system according to claim 1, in which said second means generates clock pulses having a repetition frequency equal to $2^n$ ($n$ being a positive integer) times the frequency of the carrier of the phase-modulated wave, and in which said third means includes means for controlling the phase of the reference carrier relative to the phase of each signal element of the phase-modulated wave in response to lower order bits of said digital output signals of said fifth means , the higher order bits of said digital output signals being representative of quantum phase differences between the phase modulated wave signal elements and the reference carrier.

3. A system according to claim 2, wherein said third means comprises:
   a. circuit means receptive of the lower order bits of said digital output signals for developing control signals representative of the relative phase between said reference carrier and said signal elements,
   b. an oscillator; and
   c. a controllable frequency divider circuit receptive of an oscillator output signal and said control signals for developing said reference carrier as an output thereof, the dividing rate of said divider circuit being controlled by said control signals to control the phase of the reference carrier.

4. A system according to claim 1 wherein said fourth means comprises:
   a. first circuit means receptive of said phase-modulated wave for developing a first pulse train in synchronism with zero crossings of said phase-modulated wave;
   b. a first flip-flop set by said control pulse to develop an output signal;
   c. a logic gate circuit enabled by the output signal of said first flip-flop to pass said first pulse train therethrough;
   d. second circuit means receptive of said reference carrier wave for developing a second pulse train in synchronism with zero crossings of said reference carrier wave;
   e. a second flip-flop receptive of portions of said first pulse train passed through said logic gate circuit and said second pulse train and set to develop said counting control signal by a pulse of said first pulse train and reset to terminate said counting control signal by the first pulse of said second pulse train occurring subsequent to said pulse of said first pulse train; and
   f. circuit means for resetting said flip-flop in response to the resetting of said second flip-flop.

5. A system according to claim 1 wherein said input means comprises:
   a. a filter circuit receptive in use of a phase-modulated signal comprising a plurality of phase-modulated waves having different carrier frequencies for passing a phase-modulated wave having a predetermined carrier frequency; and
   b. circuit means receptive of the phase-modulated wave passed by said filter circuit for developing an output signal having a frequency higher than said predetermined frequency and having the same amplitude envelope as said phase-modulated wave passed by said filter circuit.

* * * * *